United States Patent [19]

Mushardt et al.

[11] Patent Number: 4,827,583
[45] Date of Patent: May 9, 1989

[54] APPARATUS FOR BREAKING UP CAST FIXTURES

[75] Inventors: Heinrich Mushardt, Vechelde; Uwe Uhlig, Buchholz; Ralf Bleich, Lüneburg, all of Fed. Rep. of Germany

[73] Assignee: Körber AG, Hamburg, Fed. Rep. of Germany

[21] Appl. No.: 95,347

[22] Filed: Sep. 10, 1987

Related U.S. Application Data

[60] Division of Ser. No. 45,247, Apr. 20, 1987, Pat. No. 4,737,417, which is a continuation of Ser. No. 790,863, Oct. 24, 1985, abandoned.

[30] Foreign Application Priority Data

Oct. 27, 1984 [DE] Fed. Rep. of Germany ....... 3439439

[51] Int. Cl.$^4$ .............................................. B23P 23/00
[52] U.S. Cl. ..................................... 29/33 R; 29/239
[58] Field of Search ............... 29/33 R, 33 A, 564.1, 29/564.7, 700, 762, 156.8 B, 156.8 R, 426.1, 426.4, 426.5, 239; 164/131

[56] References Cited

U.S. PATENT DOCUMENTS

| 3,627,020 | 12/1971 | Taccone | 164/131 |
| 4,110,885 | 9/1978 | Fisher | 29/239 |
| 4,643,796 | 2/1987 | Burns | 29/762 X |

FOREIGN PATENT DOCUMENTS

| 77511 | 4/1983 | European Pat. Off. | 164/131 |
| 2427150 | 2/1980 | France | 164/131 |
| 2024677 | 1/1980 | United Kingdom | 29/33 R |

Primary Examiner—William Briggs
Attorney, Agent, or Firm—Peter K. Kontler

[57] ABSTRACT

When a cast metallic fixture for holding workpieces in a grinding machine, it is broken up by subjecting its walls to bending and tensional stresses to destory webs which connect two walls of the fixture to each other, whereupon the walls are moved apart to afford access to the workpiece. The webs can be destroyed as a result of the application of mechanical stresses to the walls of the fixture by a breaking device which is inserted into a compartment of the fixture and is movable relative thereto in order to destroy the integrity of a connector between the walls.

10 Claims, 8 Drawing Sheets

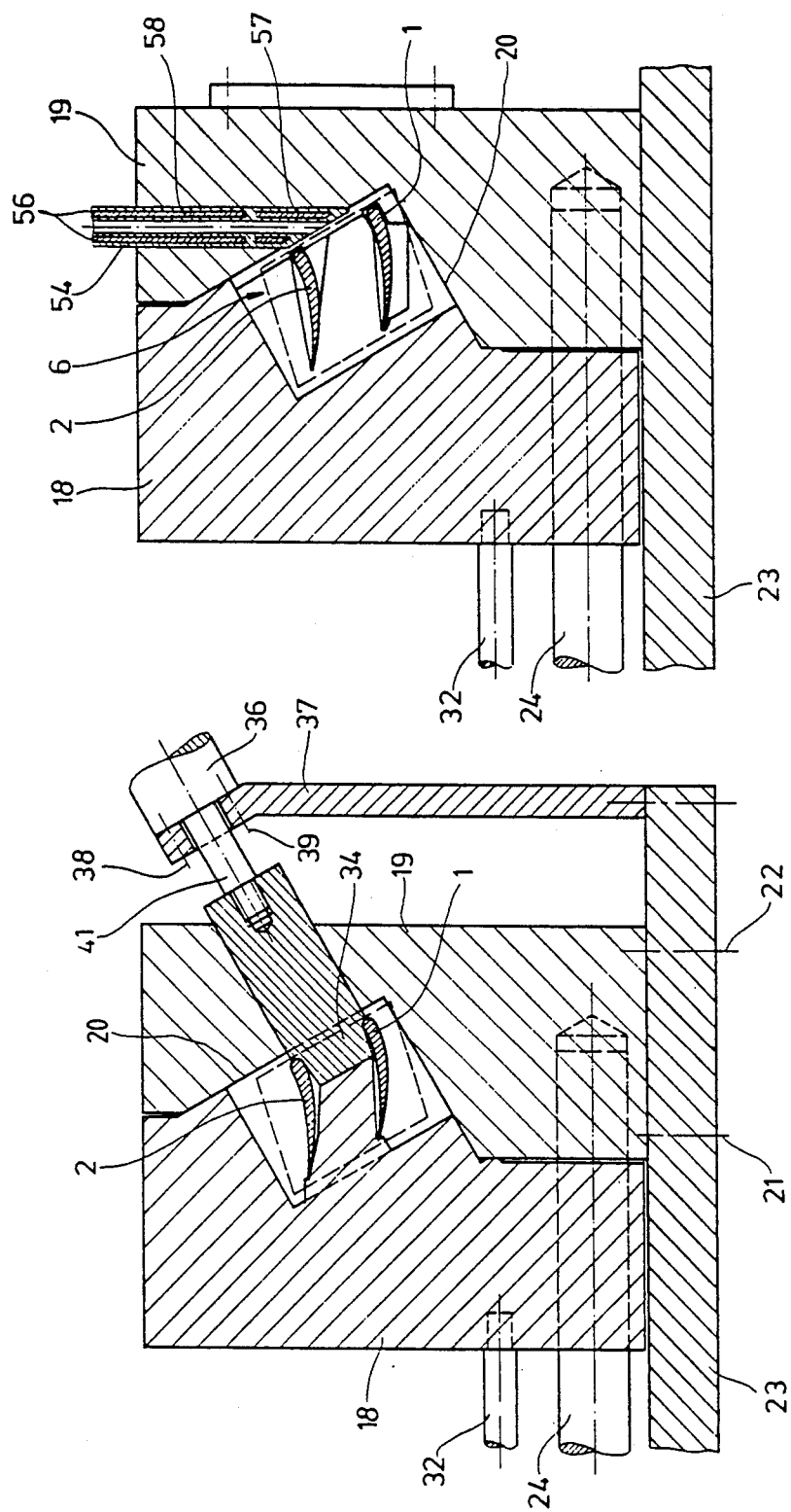

APPARATUS FOR BREAKING UP CAST FIXTURES

This application is a division of application Ser. No. 045,247, filed Apr. 20, 1987, U.S. Pat. No. 4,737,417, which is a continuation of appln. Ser. No. 790,863, filed Oct. 24, 1985, now abandoned.

CROSS-REFERENCE TO RELATED APPLICATIONS

Commonly owned copending patent application Ser. No. 638,886 filed Aug. 8, 1984 discloses a method and an apparatus for separating cast or extruded blocks from workpieces, and commonly owned copending patent application Ser. No. 666,364 discloses a device for clamping workpieces during treatment in machine tools.

BACKGROUND OF THE INVENTION

The present invention relates to the fixturing of workpieces in general, and more particularly to improvements in fixturing of workpieces in castings which can be used to support workpieces during treatment in machine tools, especially during treatment of portions of turbine guide vanes in grinding machines.

It is often necessary to subject selected portions of freshly forged or cast turbine or compressor blades to a secondary treatment, e.g., in a grinding machine. Such workpieces are often confined in cast fixtures or jigs which are used to clamp the workpieces in the work holder of a machine tool for convenient removal of material from the ends of turbine blades or like workpieces. As a rule, the material of the fixture is a metal which melts at a relatively low temperature and surrounds certain portions of a workpiece, namely those portions which need not be treated by a grinding wheel and/or another material removing tool. For example, turbine blades and similar workpieces can be encapsulated in fixtures which consist of a hardened tin-lead-antimony alloy with a melting point well below 200° C. An advantage of such encapsulation or fixturing of workpieces is that the fixture can be caused to assume a shape which is particularly suitable for convenient manipulation in a grinding machine or in another machine tool, and also that the sensitive parts of a workpiece which need not be treated by material removing tools are shielded while the exposed parts of the workpiece are treated in the selected machine tool.

When the treatment of an encapsulated workpiece is completed, it is necessary to destroy the fixture in order to gain access to the finished workpiece for the purpose of storage, further processing or assembly with similar or other parts into guide vane rings for use in compressors, turbines or the like.

One heretofore known proposal to remove the fixture from the treated workpiece is to heat the fixture to the melting point of its material. A drawback of such proposal is that, as a rule, at least a small amount of molten material of the fixture adheres to the finished workpiece and must be removed in a time-consuming and costly operation. Secondary treatment for the purpose of removing the material which deposits upon a workpiece during melting of the fixture cannot be avoided if the workpiece is a turbine blade or comprises a set of two or more coherent turbine blades because the deposits of metallic material which would remain on the blade or blades could entail rapid or immediate destruction of the corresponding part of a turbine.

In accordance with another prior proposal, an untreated workpiece is coated with a layer of hardenable synthetic plastic material prior to encapsulation in a metallic fixture which is cast around selected portions of the workpiece. This proposal exhibits the drawback that removal of the plastic layer from the workpiece upon destruction of the cast fixture is time-consuming and expensive.

German Auslegeschrift No. 28 22 828 proposes to subject the fixture to the action of a force which suffices to break up the fixture into two or more parts. The apparatus for breaking up the fixture comprises two rams which are provided with prongs and at least one of which is movable relative to the other ram to thereby crush the fixture. The prongs of the rams extend into slots which are provided in the fixture. At least one of the rams is moved at right angles to and toward the other ram so as to break the fixture along a rated break point. The apparatus which is disclosed in the German publication is suitable for breaking up fixtures which surround relatively simple workpieces, such as discrete turbine blades, but is not capable of predictably comminuting or crushing a fixture which serves to confine selected portions of a rather complex workpiece, e.g., a set of turbine blades which are integral with arcuate inner and outer guide vane ring segments. Heretofore known proposals to cast fixtures for such relatively complex workpieces involve the utilization of a mold wherein the compartment or compartments between the blades of a workpiece having two or more spaced-apart blades are filled with the material of the fixture. Therefore, the thus obtained fixture cannot be comminuted or broken up by expanding it in response to penetration of a breaking tool into the compartment or compartments between the blades because such compartment or compartments are filled with hardened material of the fixture. The only reliable mode of breaking up such fixtures is to heat them to the melting point of their material which, however, brings about the aforediscussed drawbacks, particularly the likelihood of deposition of molten material of the fixture on the finished product.

In accordance with another prior proposal, complex workpieces in the form of twin turbine blades or the like are mechanically clamped in conventional jigs which are thereupon manipulated in a machine tool to remove material from exposed portions of the workpieces. Proper retention of a complex workpiece in a jig which is not a casting necessitates extensive experience and carefulness on the part of the attendants and takes up more time than the making of a fixture from molten metallic or other suitable material. The attendants must be very careful to properly clamp the workpiece in a mechanical jig and to thereupon properly mount the jib in the machine tool so as to ensure that certain portions of the workpiece will be adequately concealed and cannot be damaged during removal of material from exposed portions as well as that the workpiece can be subjected to material removing forces of required magnitude so as to terminate the material removing action within a reasonably short interval of time. Moreover, the workpiece must be clamped with a sufficient force to eliminate the likelihood of shifting during removal of material. If the workpiece is not properly mounted in the machine tool, the application of pronounced stresses in the course of the material removing operation is highly likely to entail damage to the workpiece.

OBJECTS AND SUMMARY OF THE INVENTION

An object of the invention is to provide a novel and improved fixture or jig (also called block or capsule) which can be used to allow for convenient clamping of the encapsulated workpiece in a grinding machine or another machine tool.

Another object of the invention is to provide a fixture which can be used with particular advantage for encapsulation of rather complex workpieces, especially twin-bladed portions of turbine guide vane rings with compartments between the neighboring blades.

A further object of the invention is to provide a fixture which can be readily destroyed in a predictable fashion to afford access to the treated workpiece and whose destruction need not involve any or involves only minimal melting.

An additional object of the invention is to provide a novel and improved apparatus for making fixtures of the above outlined character.

Still another object of the invention is to provide a novel and improved method of destroying a fixture upon completion of treatment of the respective workpiece.

Another object of the invention is to provide a method of destroying cast fixtures for complex workpieces in such a way that the workpieces are not damaged during comminution of the fixtures.

A further object of the invention is to provide a novel and improved apparatus for subdividing each of a short or long series of cast fixtures into a predetermined number of parts in such a way that the there to fore confined workpiece can be readily removed for storage, further processing or assembly with other parts.

An additional object of the invention is to provide the subdividing apparatus with novel and improved means for destroying selected portions of the fixture in the region or regions of one or more rated break points.

One feature of the invention resides in the provision of a cast fixture or jog which consists of a meltable material and serves to hold and clamp composite workpieces, particularly workpieces including twin turbine blades and defining internal compartments. The improved fixture comprises a plurality of spaced-apart components in the form of walls or the like which define a space for a selected portion of a composite workpiece, and a connector (e.g., a connector consisting of two or more spaced-apart ribs or webs) which connects the components to each other in such a way that the compartment is at least substantially free of meltable material of the fixture. If the workpiece which is disposed in the space defined by the components of the fixture has one or more undercut portions (e.g., in the regions of the edges of turbine blades or in the regions where the blades are connected to each other by portions of the inner and outer turbine vane rings) which are adjacent to the components, the mutual positions of the components and of the web or webs of the connector are selected in such a way that each undercut portion is at least substantially free of meltable material of the fixture. The connector is preferably formed with one or more rated break points to facilitate predictable breaking up (distintegration) of the fixture into two or more discrete parts in response to the application of mechanical stresses to the connector, e.g., by way of the components of the fixture.

Another feature of the invention resides in the provision of an apparatus for making meltable cast fixture which are used to hold and clamp composite workpieces, such as workpieces including twin turbine blades. The apparatus comprises an open-and-shut mold including a plurality of sections which define a cavity for a workpiece and for a fixture to be cast in the mold around a selected portion of the workpiece in the cavity, a nozzle or other suitable means for admitting molten material into the cavity, and at least one insert which extends into the interior of the workpiece (e.g., between the blades of a workpiece which comprises two spaced-apart but interconnected turbine blades). The improved apparatus further comprises means for locating the workpiece in the cavity of the mold, means for opening and closing the mold, and means for moving the locating means relative to the sections of the mold. If the insert is movable relative to the sections, the apparatus further comprises means for moving the insert with reference to one or more sections. The apparatus preferably comprises several inserts, e.g., one insert for each section of the mold. The insert or inserts and the workpiece in the cavity define a plurality of sealing joints (e.g., joints which prevent molten material from flowing into certain portions of the cavity, especially between the blades of the workpiece) which extend along selected portions of the workpiece in the cavity of the mold, particularly along the inner and outer segments and along the edges of blades constituting portions of an annulus of turbine guide vanes. At least one of the joints can constitute or resemble a diaphragm gland, at least one of the joints can comprise an elastomeric material, and at least one of the joints can include a sealing strip which is yieldably biased against the workpiece in the cavity and against an insert in the mold. Furthermore, at least one of several inserts can be a stationary insert, e.g., an insert which is rigidly secured to or is integral with a section of the mold. Alternatively, at least one of the inserts can be movably mounted in the mold, and the apparatus then comprises the aforementioned means for moving the movable insert relative to the sections of the mold. For example, the apparatus can comprise a stationary insert and a movable insert. The apparatus can comprise a single inflatable insert, or several inserts one of which is inflatable, and means for inflating the inflatable insert.

The aforementioned admitting means can comprise a tubular member or nozzle and means for heating the tubular member. The tubular member comprises a first portion which is nearer to the cavity and a second portion which is more distant from the cavity, and the heating means preferably comprises first and second heating devices which can heat the respective portions of the tubular member independently of each other.

The mold can include a movable section and a stationary section, and the aforementioned locating means can comprise one or more elongated biasing elements which are reciprocably mounted in the movable section of the mold. Such locating means preferably further comprises means for guiding the biasing elements in a region outwardly adjacent to the movable section of the mold, and resilient means (e.g., coil springs) for urging the biasing elements against the workpiece in the cavity. The biasing elements are movable relative to the movable section of the mold so as to allow for an adjustment of the location of the workpiece when the mold is open, preferably while visually inspecting the workpiece in the cavity between the stationary and movable sections of the mold. The locating means can form part of an insert, i.e., the latter can be manipulated by hand or otherwise in order to maintain the workpiece in the cavity in a predetermined position with reference to the sections of the mold when the latter is closed.

A further feature of the invention resides in the provision of a method of breaking up the aforediscussed cast fixture or jog so as to liberate the workpiece which is partially surrounded thereby and which defines a compartment so as to allow for insertion of a breaking tool. The method comprises the steps of applying to spaced-apart components of the fixture simultaneous tensional and bending stresses so as to break the connector, i.e., to destroy the integrity of the connector and to thus permit the components of the fixture to move relative to each other, and moving the thus separated components of the fixture apart so as to afford access to the workpiece. Since the connector preferably consists of a meltable material, its disintegration can be promoted by heating the connector in the course of the stress-applying step. It is also possible to heat selected portions of the components of the fixture to the melting point of their material in the course of the stress-applying step so as to melt the material of the fixture in the regions of undercuts in the workpiece which is confined in the fixture.

The stress-applying step can be replaced with the step of heating one or more selected portions of the connector to the melting point of its material to thus destroy the integrity of the connector and allow for movements of the components of the fixture relative to each other. Such heating step is then followed by the step of moving the separated components of the fixture apart so as to afford access to the previously confined workpiece.

Still another feature of the invention resides in the provision of an apparatus for breaking up cast fixtures or jigs for composite workpieces, such as workpieces including the aforediscussed plural blades forming parts of turbine guide vane rings. The apparatus comprises means for holding the fixture, and such holding means comprises stressing means for subjecting the fixture to bending and tensional stresses. The apparatus further comprises a breaking device which is insertable into the compartment of the workpiece in the fixture which is held by the holding means and is movable relative to the fixture to destroy the integrity of the connector so that the components of the fixture can be moved apart in order to afford access to the workpiece. The stressing means can comprise a first member which is engageable with one component of the fixture in the holding means, a second member which can be caused to engage another component of the fixture, and means for pivoting the second member relative to the first member about a predetermined axis. The breaking device can comprise several projections (e.g., in the form of fingers, prongs, claws, teeth or the like) which are movable into engagement with the connector of the fixture in the holding means, and means for moving the projections relative to the two members in two mutually inclined planes. The means for moving the projections can comprise a compound slide and the breaking device can further comprise means for heating at least one of the projections so that the heated projection can melt the material of the connector forming part of the fixture in the holding means. The compound slide comprises a first mobile carriage and a second carriage which is mounted and is movable relative to the first carriage into contact with the fixture which is held by the holding means. Such apparatus preferably further comprises means for heating the second carriage so that the latter can directly melt the material of the fixture.

The means for moving one of the first and second members of the holding means relative to the other member and/or vice versa preferably comprises one or more discrete fluid-operated motors, e.g., one motor for each of these members.

The breaking means can comprise an inflatable breaking member and means for inflating such breaking member so that the latter can break the connector of the fixture in the holding means.

The novel features which are considered as characteristic of the invention are set forth in particular in the appended claims. The improved apparatus themselves, however, both as to their construction and their mode of operation, together with additional features and advantages thereof, will be best understood upon perusal of the following detailed description of certain specific embodiments with reference to the accompanying drawing.

BRIEF DESCRIPTION OF THE DRAWING

FIG. 8 shows a portion of the structure of FIG. 7 but with the mold in closed position;

FIG. 9 is a sectional view of the apparatus in a plane which is parallel to the plane of FIG. 8 and shows the means for admitting molten material into the cavity of the mold;

DESCRIPTION OF THE PREFERRED EMBODIMENTS

Figure 1:
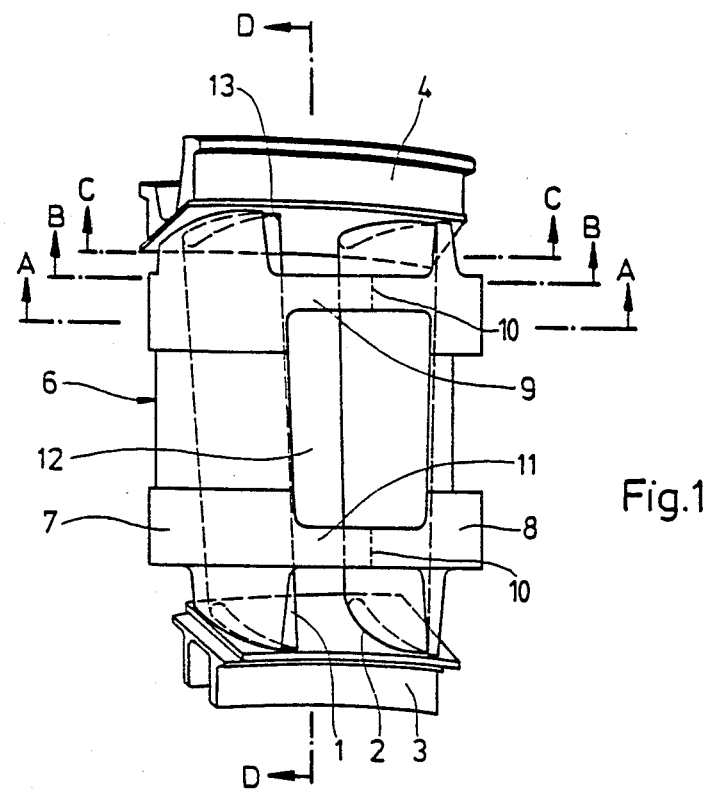
FIG. 1 is a perspective view of a twin-bladed workpiece and of a fixture which surrounds selected portions of the workpiece.
Figures 2, 3:
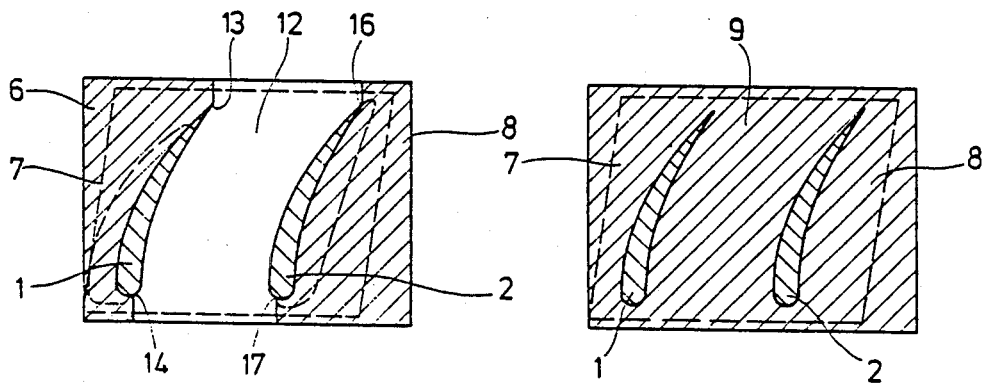
FIG. 2 is a sectional view as seen in the direction of arrows from the line A—A of FIG. 1.
FIG. 3 is a sectional view as seen in the direction of arrows from the line B—B of FIG. 1.
Figure 4:
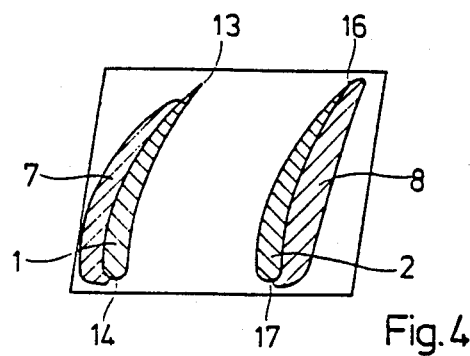
FIG. 4 is a sectional view as seen in the direction of arrows from the line C—C of FIG. 1.
Figure 5:
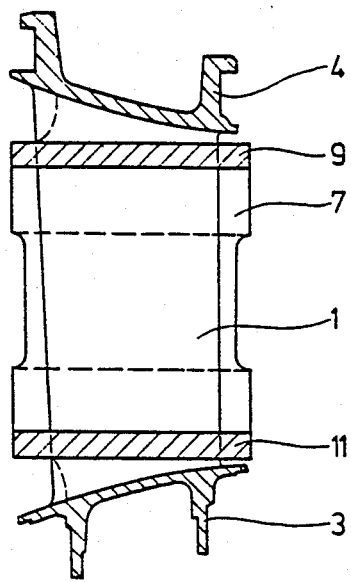
FIG. 5 is a sectional view as seen in the direction of arrows from the line D—D of FIG. 1.
Figure 6:
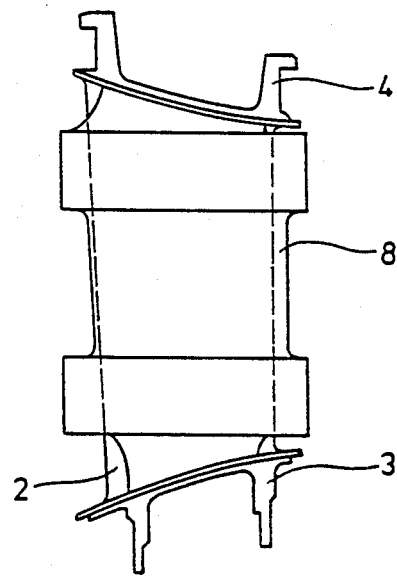
FIG. 6 is an elevational view as seen from the right-hand side of FIG. 1.

FIGS. 1 to 6 show a fixture or jig 6 for holding a composite workpiece including two spaced-apart (outer and inner) blades 1, 2 forming part of a portion of an annulus of turbine guide vanes. The blades 1, 2 are integrally connected with an inner ring segment 3 and an outer ring segment 4. The parts 1, 2, 3 and 4 together define a compartment 12. The fixture 6 comprises two spaced-apart components or walls 7 and 8 and a connector including two spaced-apart ribs or webs 9, 11 each of which is integral with the components 7 and 8. The components 7 and 8 are outwardly adjacent to the blades 1 and 2 (see particularly FIGS. 2 and 4) so that the component 7 is adjacent to the convex outer side of the outer blade 1, and the component 8 is adjacent to the concave outer side of the inner blade 2. The webs 9 and 11 extend into the compartment 12 but the remainder of this compartment is devoid of the material of the fixture 6. The compartment 12 is also devoid of the material of the fixture 6 in the regions of the front and rear edges 13, 14 of the blade 1 as well as in the regions of the front and rear edges 16, 17 of the blade 2 (FIGS. 2 and 4). Each of the webs 9, 11 is provided with at least one rated break point 10 so as to allow for predictable disintegration of such webs when the workpiece is to be removed from the fixture 6 upon completion of the material removing treatment in a machine tool, particularly in a grinding machine. When the webs 9 and 11 are broken at the points 10, the components 7, 8 of the fixture 6 are moved apart to afford access to the treated workpiece. The workpiece is normally treated, by one or more grinding wheels or by other suitable tools, in the regions of its segments 3 and 4, i.e., the tool or tools remove material from those portions of the workpiece which are not confined in the fixture 6. An advantage of the feature that the compartment 12 extends all the way to the edges 13, 14 and 16, 17 of the blades 1 and 2 is that such edges are highly unlikely to be damaged while the fixture 6 is being broken up to allow for removal of the treated workpiece.

Those portions of the webs 9 and 11 which extend into the compartment 12 occupy only a small portion of the compartment so that the major portion of such compartment is accessible to one or more tools which are used to subdivide the fixture 6 into two or more parts in order to allow for removal of a treated workpiece.

The improved fixture renders it possible to manipulate workpieces in a grinding machine or in another machine tool in a manner which would not be possible were the workpieces clamped directly in the work holder of the machine tool. A workpiece can be properly held and/or its orientation changed without coming into contact with any parts of the machine tool save for the material removing implement or implements.

Figure 7:
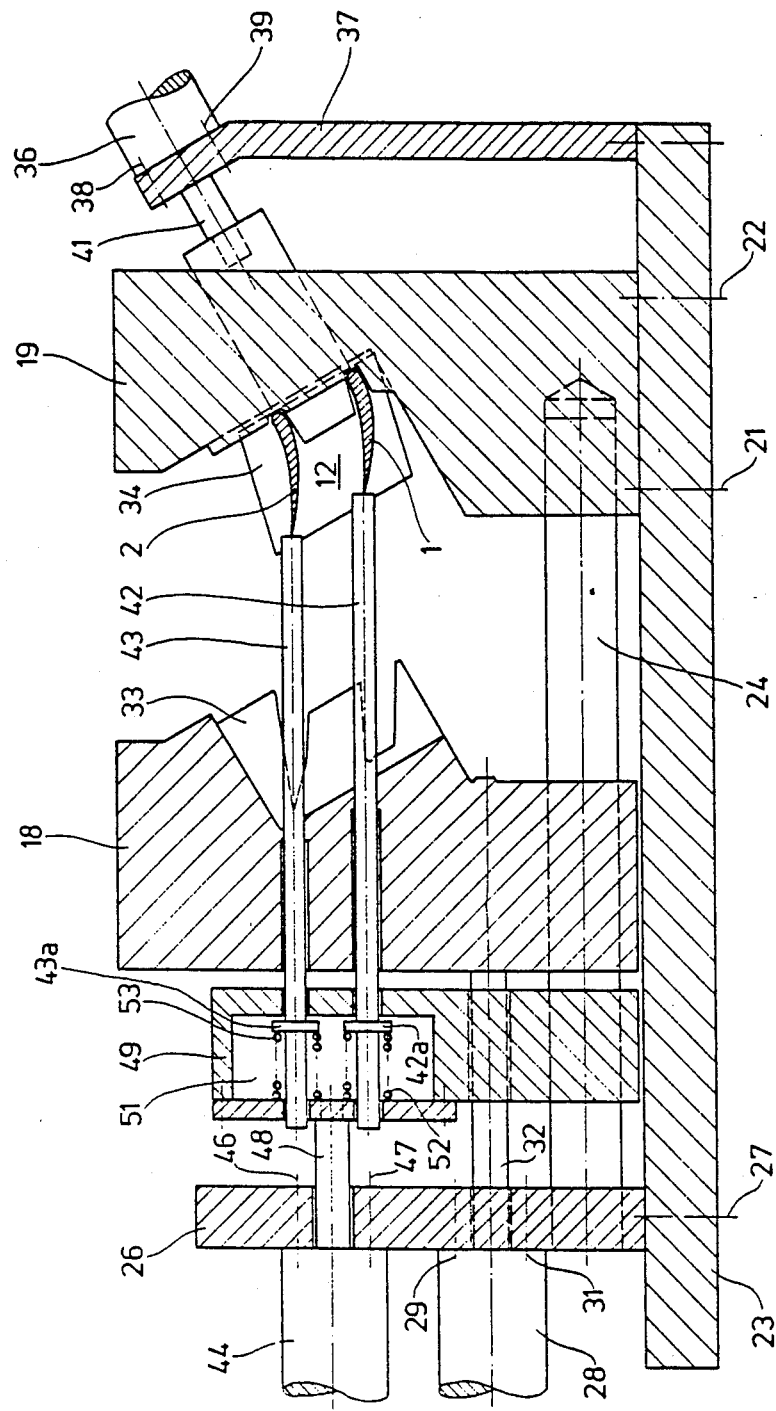
FIG. 7 is a vertical sectional view of an apparatus which is used to make the fixture of FIGS. 1 to 6, the mold being shown in open position.

FIGS. 7 to 9 show a first apparatus for making meltable cast fixtures 6 or analogous fixtures or jigs for holding composite workpieces in grinding machines or in other types of machine tools. The apparatus comprises an open-and-shut mold including a fixed section 19 which is rigidly secured to a stationary base plate 23 by suitable fasteners 21 and 22 (indicated by phantom lines), and a mobile section 18 which is shiftable toward and away from the section 19 along one or more horizontal tie rods 24 or analogous guide elements. One end portion of each tie rod 24 is threadedly connected with the fixed mold section 19, and the other end portion of each tie rod 24 is secured to a stationary platen 26 which is affixed to the base plate 23 by one or more fasteners 27. FIG. 7 shows the mold in open position so that the workpiece (note the blades 1 and 2) is readily accessible in the mold cavity 20.

The means for opening and closing the mold includes means for moving the section 18 relative to the section 19, and such moving means includes one or more fluid-operated (preferably hydraulic) motors 28 secured to the platen 26 by a suitable fastener means 29, 31 and serving to reciprocate the section 18 along the illustrated tie rod 24. The cylinder of the illustrated motor 28 is rigidly secured to the platen 26 and its piston rod 32 is affixed to the section 18.

The mold of FIGS. 7 to 9 further comprises two inserts including a first insert 33 which is rigidly secured to or is integral with the section 18, and a second insert 34 which is movably supported by the fixed section 19. The configuration of the inserts 33 and 34 is such that, when the mold is closed (see FIGS. 8 and 9), the compartment 12 between the blades 1, 2 as well as the regions of the edges 13, 14 and 16, 17 of such blades are shielded against penetration of molten material into the corresponding portions of the cavity 20. The means for moving the insert 34 relative to the sections 18, 19 and insert 33 comprises a fluid-operated (hydraulic or pneumatic) motor 36 whose cylinder is affixed to a platen 37 and whose piston rod 41 is affixed to the insert 34 and extends through the section 19. The means for securing the cylinder of the motor 36 to the platen 37 comprises suitable fasteners 38 and 39. The platen 37 is affixed to the base plate 23.

The apparatus of FIGS. 7 to 9 further comprises means for properly locating the workpiece in the cavity 20 of the mold. The locating means comprises two elongated parallel pin- or rod-shaped biasing elements 42 and 43 which are reciprocable in bores of the movable mold section 18 and whose tips can be caused to shift the workpiece relative to the fixed section 19 before the mold is closed in response to actuation of the motor 28. Each of the biasing elements 42, 43 can be moved independently of the other and these biasing elements are respectively mounted to act upon the blades 1 and 2 of the workpiece in the cavity 20. The means for actuating or moving the biasing elements 42, 43 relative to the sections 18, 19 of the mold and relative to the workpiece in the cavity 20 comprises a further fluid-operated (hydraulic or pneumatic) motor 44 whose cylinder is affixed to the platen 26 by fasteners 46, 47 and whose piston rod 48 is secured to a hollow guide 49 which is reciprocable along the tie rod or tie rods 24. The guide 49 defines a chamber 51 for coil springs 52, 53 which surround the adjacent portions of the biasing elements 42, 43 and react against a detachable wall of the guide 49 to thereby bear against collars 42a, 43a in order to urge the corresponding biasing elements toward the fixedly mounted mold section 19.

When the mold is open, the biasing element 42 and/or 43 is shifted (if necessary) in order to alter the position of the workpiece relative to the section 19 and insert 34. Such adjustment of the location or positioning of the workpiece in the cavity 20 can be inspected by an operator. The operator can employ a suitable tool to shift the element 42 or 43 axially against the opposition of the respective spring 52 or 53. The motor 46 is used to jointly shift the biasing elements 42, 43 relative to the sections 18 and 19 of the mold, preferably while the mold is open so that the position of the workpiece in the cavity 20 can be inspected by the attendant or attendants.

FIG. 8 shows the mold of FIG. 7 in closed position. The workpiece in the cavity 20 is shown in a view as seen in FIG. 2, i.e., in the direction of arrows from the line A—A of FIG. 1. FIG. 9 shows the mold in closed position but in a sectional view such that the workpiece is shown in a manner as in FIG. 3, i.e., in the direction of arrows from the line B—B of FIG. 1. FIG. 9 further shows the means for admitting molten metallic material into the cavity 20 when the mold including the sections 18 and 19 is closed. Such material admitting means comprises a tubular nozzle 54 including an outer portion 58 which is more distant from the cavity 20 and an inner portion 57 which is nearer to the cavity and hence to the workpiece in such cavity. The means 56 for heating the tubular nozzle 54 comprises a first heating device for the outer portion 58 and a second heating device which can heat the inner portion 57 of the nozzle independently of the selected temperature of the outer portion. The heating device (e.g., an electric resistance heater) for the inner portion 57 is activated to melt the solidified material which connects the fixture 6 in the cavity 20 with the rigidified material in the outer portion 58 of the nozzle 54. The heating device for the outer portion 58 of the nozzle 54 is activated in order to melt the material in such outer portion preparatory to renewed use of the mold, i.e., melting of rigidified material in the outer portion 58 of the nozzle 54 is necessary in order to establish a path for the flow of molten material into the cavity 20 subsequent to removal of a freshly formed fixture 6 and subsequent to placing of a fresh (untreated) workpiece into the cavity 20.

Figure 10:
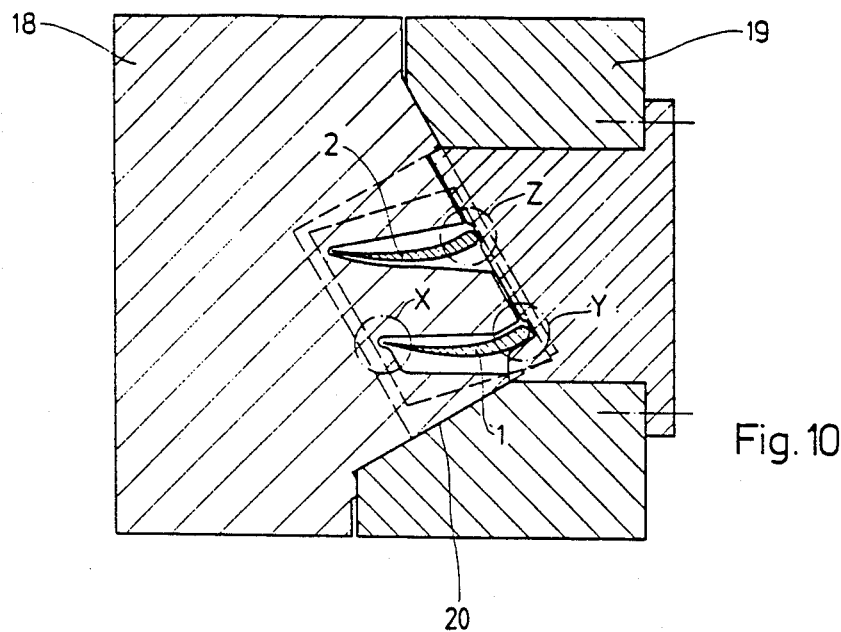
FIG. 10 is a sectional view of a modified apparatus wherein the inserts constitute means for locating the workpiece in the cavity of the mold.
Figure 11:
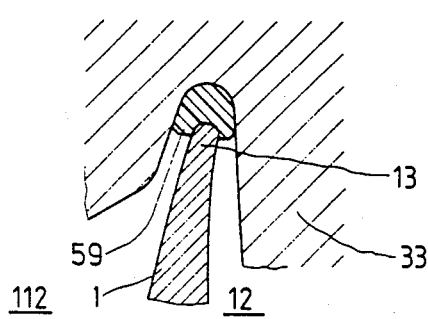
FIG. 11 is an enlarged sectional view of the detail within the phantom-line circle X in FIG. 10 and shows a first joint between the edge of a blade of the workpiece and the adjacent portion of the mold.

FIG. 10 shows a portion of a modified apparatus for the making of fixtures which surround and hold selected portions of workpieces. The workpiece which is shown in FIG. 10 is identical with that of FIGS. 1 to 6 and is depicted in a sectional view as seen in the direction of arrows from the line C—C of FIG. 1. The inserts in the cavity 20 of the mold including the sections 18 and 19 shown in FIG. 10 define with the workpiece a plurality of sealing joints which extend along selected portions of the workpiece and prevent penetration of molten material into the compartment between the blades 1 and 2. The inserts define sealing joints along the portions 3 and 4 of the workpiece (the portions 3 and 4 are not shown in FIG. 1 but they are identical with the segments 3 and 4 shown in FIG. 1) as well as along the edges 13, 14 and 16, 17 of the respective blades 1 and 2. These joints are designed to reliably prevent the flow of molten material into certain portions of the cavity 20, and they may be constructed and configured in a number of ways including those shown in FIGS. 11 to 14. For example, each of the joints can constitute a diaphragm gland of any known design. Alternatively, and as shown in FIG. 11, each such joint can comprise an elongated strip, bar or rod of elastomeric material. This is shown in FIG. 11 wherein the elastic strip 59 extends along the front edge 13 of the blade 1 and is deformed by the adjacent insert 33 to establish a fluid-tight seal which prevents penetration of molten material from the space 112 at the convex outer side of the blade 1 to the compartment 12 at the concave inner side of such blade.

Figure 12:
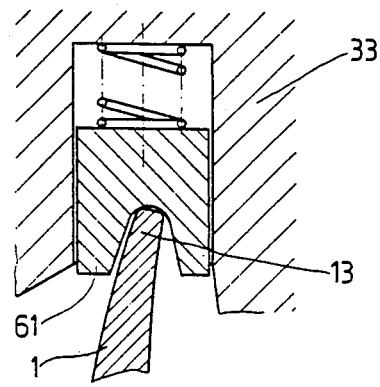
FIG. 12 is an enlarged sectional view of a modified joint.

FIG. 12 shows a modified joint including an elastomeric or rigid sealing strip 61 which is biased against the front edge 13 of the blade 1 by one or more springs 60 reacting against the insert 33. The sealing strip 61 and the spring or springs 60 can be used in lieu of the elastomeric sealing strip 59 of FIG. 11.

Figure 13:
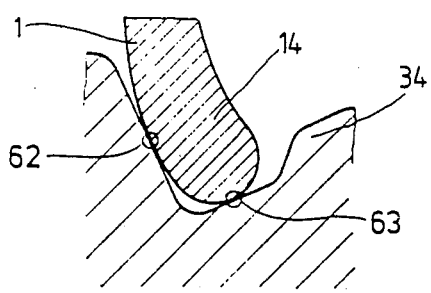
FIG. 13 is an enlarged view of the detail within the phantom-line circle Y of FIG. 10.

Referring to FIG. 13, there is shown another mode of forming a sealing joint between the rear edge 14 of the blade 1 and the adjacent insert 34. The front edge 14 contacts the insert 34 along two lines 62 and 63 to thus prevent the flow of molten material into the compartment 12.

Figure 14:
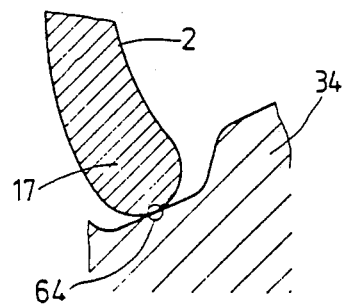
FIG. 14 is an enlarged view of the detail within the phantom-line circle Z of FIG. 10.

FIG. 14 shows a further sealing joint wherein the rear edge 17 of the blade 2 is in linear contact with the adjacent insert 34 at 64.

Two or more different sealing joints can be used in one and the same mold. The selection of joints will depend on the configuration of the corresponding portions of the workpiece and inserts as well as on the nature and pressure of molten material which is poured into the cavity 20 via nozzle 54 (not shown in FIG. 10). It is further clear that the strips 59 and 61 should be capable of standing the temperature of molten material which is poured into the cavity 20.

Figure 15:
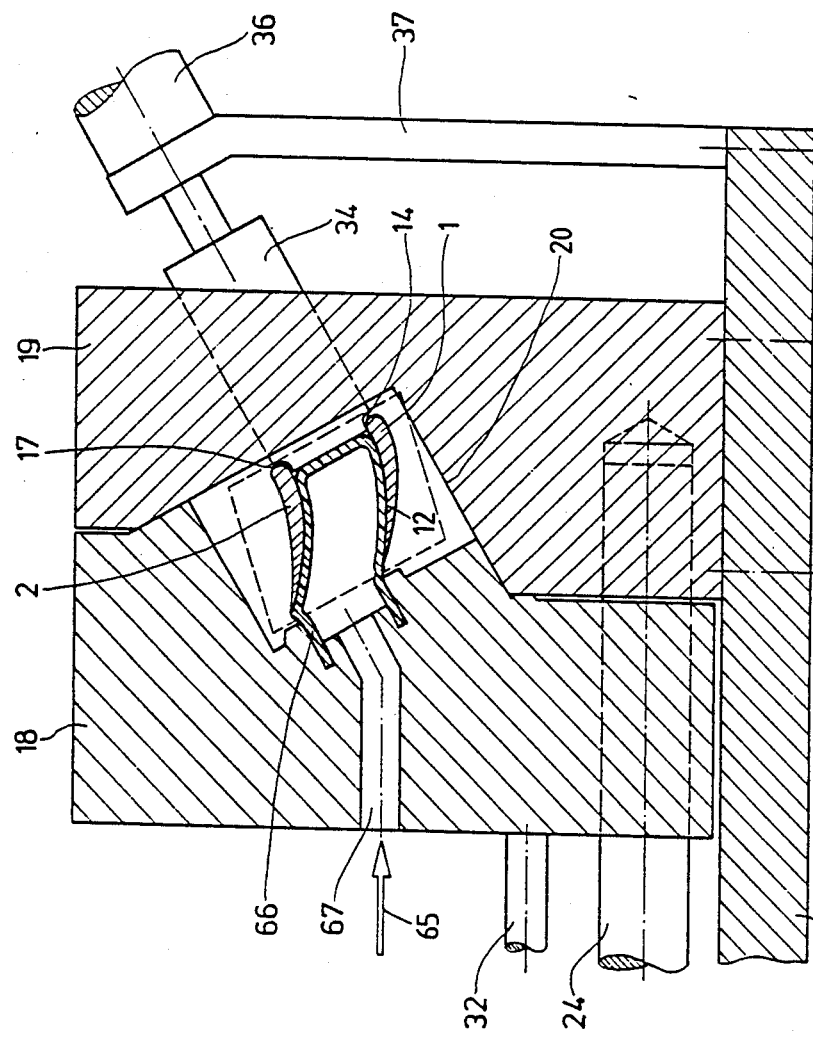
FIG. 15 is a sectional view of a third fixture making apparatus wherein an insert is inflatable to thereby prevent penetration of molten material into certain portions of the compartment between the blades of the workpiece.

FIG. 15 shows a further apparatus which is similar to or identical with the apparatus of FIGS. 7 to 9 except that one of the inserts 33, 34 is replaced with an inflatable insert 66 which is disposed in the compartment 12 between the blades 1, 2 and is inflatable by inflating means (including a source of pressurized gaseous or hydraulic fluid denoted by the arrow 65) by way of a channel 67 in the mobile mold section 18. The insert 66 is made of an expandible elastomeric material which can stand the temperature of molten metallic material that fills the remaining portion of the cavity 20. An advantage of the insert 66 is that it obviates the need for some or all of the sealing joints because it can be expanded to assume a shape which enables it to prevent molten material from contacting the edges of the blades 1, 2 and/or certain other portions of the workpiece in the cavity 20. The insert 66 of FIG. 15 replaces the insert 33 of FIG. 7 and cooperates with the mobile insert 34. The latter can be omitted, i.e., the elastically deformable insert 66 can perform the functions of several inserts plus the functions of several sealing joints. If the insert 66 is to replace the inserts 33 and 34, it is designed to expand all the way to the rear edges 14 and 17 of the blades 1 and 2 in the cavity 20. The material of the insert 66 is a heat-resistant elastomeric substance, such as natural rubber or artificial rubber, which can stand the temperature of molten material that is to form the fixture in the cavity 20. If the molten material is a tin-lead-antimony alloy, its melting point is at or close to 135° C.

The mold of FIGS. 7-9, FIG. 10 or FIG. 15 can comprise two or more separable sections and a discrete insert for each section.

Figure 16:
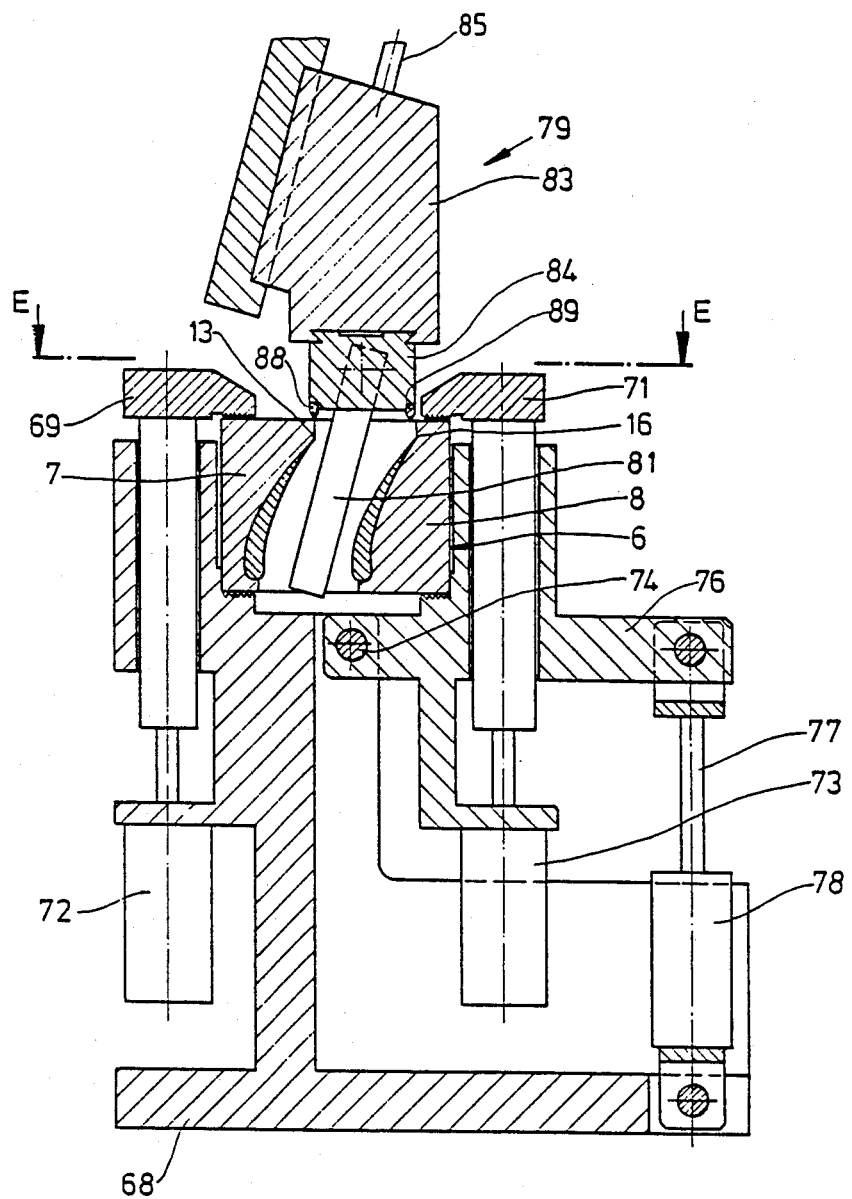
FIG. 16 is a vertical sectional view of an apparatus for breaking up the fixture which is produced in the apparatus of FIGS. 7 to 15.
Figure 17:
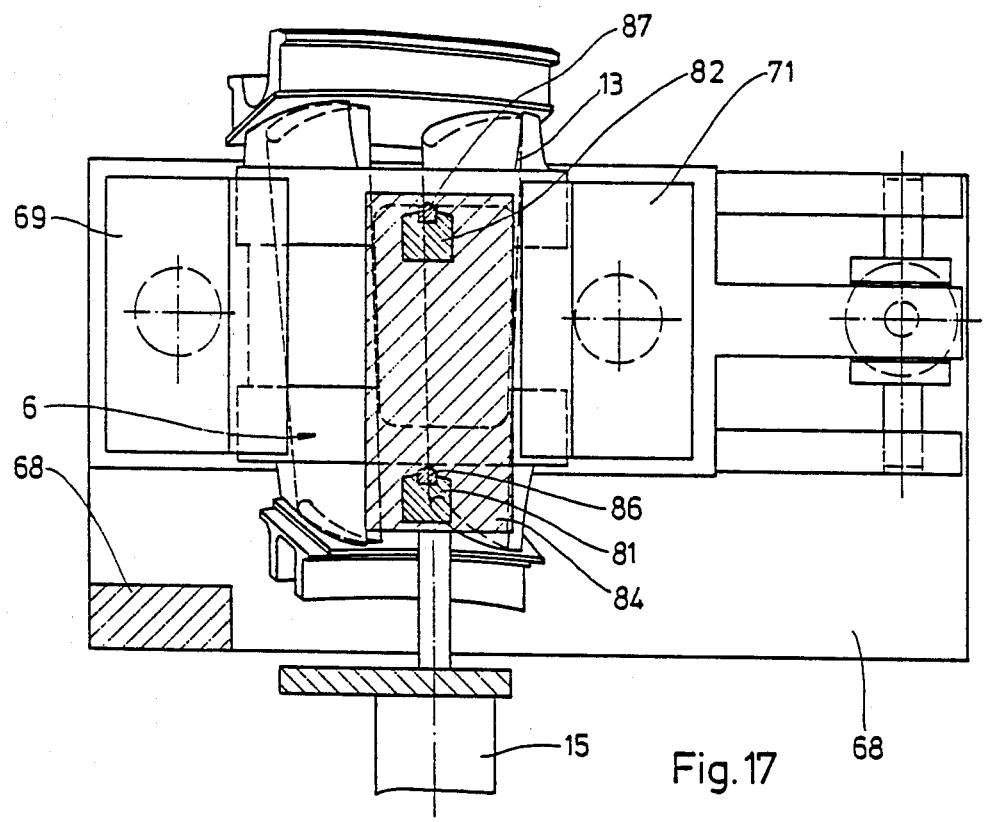
FIG. 17 is a horizontal sectional view as seen in the direction of arrows from the line E—E of FIG. 16.

Once the workpiece has been treated in a machine tool, e.g., in a grinding machine, the fixture 6 must be separated therefrom in such a way that the workpiece is not damaged and also that the entire material of the fixture is separated therefrom. FIGS. 16 and 17 show one form of an apparatus which can be used to break up a fixture 6 so as to liberate the treated workpiece.

The apparatus of FIGS. 16 and 17 comprises a frame 68 which carries holding means including a stationary first holding and clamping member 69 and a second holding and clamping member 71 which is pivotable relative to the member 69 about a predetermined axis defined by a shaft 74. The fixture 6 which is about to be destroyed is clamped by the member 69, and such fixture is then subjected to simultaneous bending and tensional stresses by the member 71 which, for such purpose, is caused to pivot about the axis of the shaft 74. The means for moving the member 69 relative to the frame 68 and member 71 comprises at least one first fluid-operated (hydraulic or pneumatic) motor 72 which can cause the member 69 to reliably clamp and hold a fixture 6 which is seated in the frame 68. The means for moving the member 71 relative to the frame 68 and member 69 comprises at least one additional (hydraulic or pneumatic) motor 78 whose cylinder is articulately connected to the frame 68 and whose piston rod 77 is articulately connected with one end of a lever 76 which is fulcrumed at 74. The lever 76 supports a further pneumatic or hydraulic motor 73 which can move the member 71 into and from engagement with the fixture 6 in the frame 68. The motors 72 and 73 can be said to constitute a means for moving the members 69, 71 of the holding means into clamping and holding engagement with a fixture 6, and the motor 78 and the lever 76 constitute a means for subjecting the fixture (which is clamped by the members 69, 71) to combined bending and tensional stresses so as to facilitate and/or effect destruction of the integrity of the webs 9 and 11 between the components 7, 8 of the fixture in the frame 68.

A properly seated fixture 6 is held in such a way that the members 69, 71 respectively engage the components 7 and 8.

The apparatus of FIGS. 16 and 17 further comprises a device for breaking the webs 9 and 11 while the components 7, 8 are subjected to simultaneous bending and tensional stresses. As mentioned above, the webs 9 and 11 are formed with rated break points 10 to ensure predictable breaking and more convenient separation of the destroyed fixture 6 from the treated workpiece. The breaking device comprises two projections in the form of fingers 81 and 82 which are mounted on the carriage 84 of a compound slide 79 movable relative to the frame 68 at a level above the fixture 6. The slide 79 comprises a second carriage 83 which is movable with the carriage 84 up and down, as viewed in FIG. 16, by a fluid-operated motor including a piston rod 85. The second carriage 84 of the compound slide 79 is movable with reference to the carriage 83 in a direction at right angles to the plane of FIG. 16 by a fluid-operated motor 15 (see FIG. 17). When the carriage 83 is lowered by the motor including the piston rod 85, the finger 81 of the breaking device enters the compartment 12 between the blades 1, 2 of the workpiece which is held by the fixture 6 in the frame 68 and the finger 82 is outwardly adjacent the web 11. Thus, one of the fingers 81 and 82 is then located in the space between the webs 9, 11 and the other finger (82) is then disposed outside of the compartment 12 but close to the web 11 so that the fingers 81, 82 can respectively destroy the webs 9, 11 by moving with the carriage 84 relative to the carriage 83 of the compound slide 79 after the carriage 83 has completed the introduction of the fingers 81, 82 into and adjacent to the compartment 12. Such movement of the carriage 84 enables the fingers 81, 82 to engage the webs 9, 11 and break them in the regions of the respective rated break points 10.

The fingers 81, 82 are respectively equipped with heating means 86, 87 which come into contact with the respective webs 9 and 11 to heat the adjacent portions of such webs to the melting point of the material of the fixture 6 in the frame 68. The heating means 86, 87 can constitute electric resistance heaters or any other suitable heating elements which can raise the temperature of the respective portions of the fingers 81, 82 at least to the melting point of the material of the webs.

It is also possible to provide the carriage 84 with heating means 88, 89 to heat those portions of the carriage 84 which is caused to move toward the front edges 13, 16 of the blades 1, 2 when the carriage 83 is lowered by the piston rod 85 to move the fingers 81, 82 to the aforediscussed operative positions for engagement with the webs 9, 11 in response to subsequent movement of the carriage 84 with reference to the carriage 83. The purpose of the heating devices 88, 89 is to melt the material of the fixture 6 in the regions of the front edges 13 and 16.

When the breaking of the fixture 6 is completed as a result of pivoting of the holding member 71 relative to the frame 68 and holding member 69, the motor 78 is caused to pivot the lever 76 in a clockwise direction, as viewed in FIG. 16, so that the separated components 7, 8 of the fixture 6 can descend into a collecting receptacle, not shown. The liberated workpiece continues to rest on the fingers 81, 82 and can be removed from the frame 68 in response to upward movement of the carriage 83 and/or in response to horizontal movement of the carriage 84 relative to the carriage 83. The compound slide 79 can also be used to introduce fresh fixtures 6 into the frame 68. Each fresh fixture is placed onto the fingers 81, 82 of the breaking device.

The fingers 81, 82 and their heating means 86, 87 can be operated to destroy the integrity of the webs 9, 11 without the application of any mechanical stresses, i.e., merely by melting the adjacent webs 9, 11 in the regions of the corresponding rated break points 10.

Figure 18:
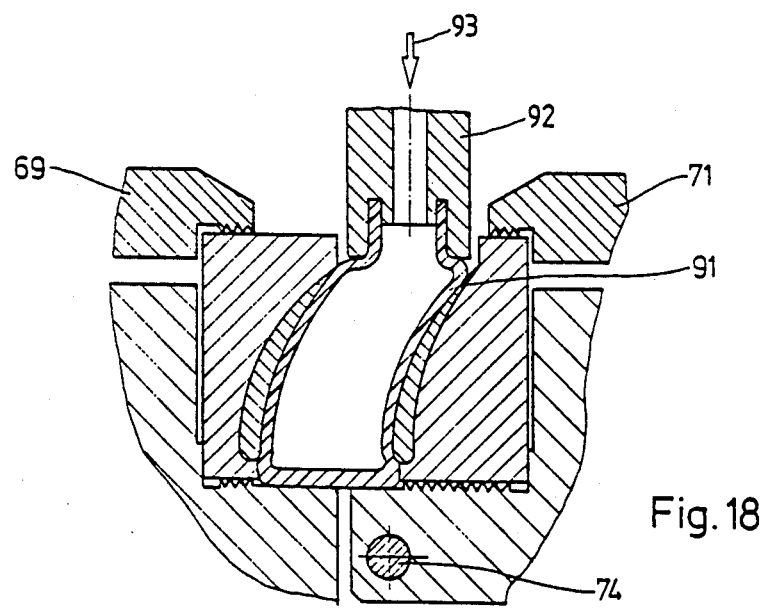
FIG. 18 is a fragmentary sectional view of a modified breaking apparatus wherein the breaking device includes an inflatable breaking member.

FIG. 18 shows a second apparatus for breaking up fixtures 6 so as to afford access to the respective workpieces. The breaking device of the apparatus shown in FIG. 18 comprises an inflatable elastomeric breaking member 91 which is fixedly and sealingly connected to a nozzle or nipple 92 serving as a means for connecting the inflatable member 91 to a source 93 of pressurized gaseous or liquid medium. The member 91 is lowered into the compartment 12 between the blades 1, 2 and is then caused to expand so as to bear against the inner sides of the webs 9, 11 and to break the webs in the regions of the respective rated break points 10.

The apparatus of FIGS. 16–17 and of FIG. 18 render it possible to rapidly destroy a fixture without damaging the theretofore confined workpiece and within a short interval of time. The operation of such apparatus, as well as of the apparatus for making the fixtures, can be automated to any desired extent. The comminution of a fixture so that it yields two or more parts in order to allow for convenient removal of the workpiece takes place without depositions of any material of the fixture on the workpiece.

The drawing merely shows one presently preferred type of workpieces which can be confined in and liberated from fixtures in accordance with the methods and apparatus of the present invention. However, it is clear that the methods and apparatus can be utilized for the making of fixtures which can hold other workpieces, e.g., portions of turbine guide vanes with three or more blades, which define compartments and which cannot be readily manipulated in heretofore known molds for cast fixtures. Furthermore, the improved method and apparatus can be used with equal or similar advantage for the making of fixtures for relatively simple workpieces, such as individual turbine blades.

Without further analysis, the foregoing will so fully reveal the gist of the present invention that other can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for breaking up a cast fixture for composite workpieces, particularly for workpieces including turbine blades which define a compartment, wherein several spaced-apart components surround the workpiece and are integral with a connector, comprising means for holding the fixture, said holding means comprising stressing means for subjecting the fixture to bending and tensional stresses; and a breaking device insertable into the compartment of the workpiece in the fixture which is held by said holding means and movable relative to the fixture to destroy the integrity of the connector so that the components of the fixture can be moved apart to thus afford access to the workpiece.

2. The apparatus of claim 1, wherein said stressing means includes a first member which is engageable with one component of the fixture in said holding means, a second member which is engageable with another component of such fixture, and means for pivoting said second member relative to said first member about a predetermined axis.

3. The apparatus of claim 2, wherein said breaking device comprises several projections movable into engagement with the connector of the fixture in said holding means, and means for moving said projections in two planes relative to said members.

4. The apparatus of claim 3, wherein said breaking device further comprises means for heating at least one of said projections so that the one projection can melt the material of the connector forming part of the fixture in said holding means.

5. The apparatus of claim 3, wherein the means for moving said projections comprises a compound slide.

6. The apparatus of claim 5, wherein said slide comprises a first mobile carriage and a second carriage mounted on and movable relative to said first carriage, said second carriage being movable into contact with the fixture in said holding means and further comprising means for heating said second carriage so that the latter can melt the material of the fixture.

7. The apparatus of claim 2, further comprising means for moving said members relative to each other.

8. The apparatus of claim 7, wherein the means for moving said members relative to each other comprises a discrete fluid-operated motor for each of said members.

9. The apparatus of claim 1, wherein said breaking means comprises an inflatable breaking member.

10. The apparatus of claim 9, wherein said stressing means includes a stationary first stressing member, a second stressing member, and means for pivoting said second member relative to said first member about a predetermined axis.

* * * * *